March 31, 1970 J. M. JANS 3,504,313

QUICK DETACHABLE STEPPING SWITCH

Filed Dec. 13, 1967 2 Sheets-Sheet 1

INVENTOR
JOSEPH M. JANS
by
Mason, Kolehmainen, Rathburn and Wyss
ATTORNEYS.

QUICK DETACHABLE STEPPING SWITCH

Filed Dec. 13, 1967 2 Sheets-Sheet 2

INVENTOR
JOSEPH M. JANS
by Mason, Kolehmainen, Rathburn and Wyss
ATTORNEYS.

United States Patent Office 3,504,313
Patented Mar. 31, 1970

3,504,313
QUICK DETACHABLE STEPPING SWITCH

Joseph M. Jans, Skokie, Ill., assignor to C. P. Clare & Company, Chicago, Ill., a corporation of Delaware Filed Dec. 13, 1967, Ser. No. 690,165
Int. Cl. H01h *51/08*
U.S. Cl. 335—138 8 Claims

ABSTRACT OF THE DISCLOSURE

A stepping switch for quick connection to or removal from an associated circuit includes a number of wipers advanced over bank level contacts by an electromagnetically actuated step drive mechanism. The bank levels are formed in sub-assemblies of one printed circuit panel with one edge interposed between the insulating supports for two levels of bank contacts. The free ends of the bank contacts are offset from the plane of the contacts toward the panel and soldered to the conductive layers on the opposite sides of the panel. These conductive layers extend to an edge of the board to provide an edge connection that is inserted into a conventional edge receptacle to physically mount and electrically connect the switch in a quick detachable manner.

This invention relates to a stepping switch and, more particularly, to a stepping switch including new and improved detachable connecting and mounting means.

Stepping switches provide a convenient means for sequencing events or data flow in a variety of different system applications. In a number of these applications, such as vending machines and automatic test equipment, it would be desirable to be able to quickly replace or remove the stepping switch from the system. This cannot be done when the bank levels which may number from one to twelve, each with ten to fifty-two points, are directly wired to the circuitry as by leads soldered to the bank level terminals. Various different approaches have been tried in an attempt to avoid the necessity of removing these numerous soldered connections in order to remove the switch.

One means used is to provide tapered tabs or variously formed or shaped connectors on the leads that snap onto the bank contact terminals and provide a detachable connection. This, however, requires individual detachment of the leads as well as other means for mechanical support of the stepping switch. In addition, the formation of many of these shaped connectors is extremely costly and cannot be used except in situations in which large volume applications are contemplated. Another technique used is that of replacing the bank level contacts with printed circuit boards with "flushed" conductive segments adjacent an edge of the board to provide the contacts engaged by the switch wipers. In this arrangement, the wipers slide over the insulating panel between adjacent contact areas, and problems are encountered with respect to the resistance of the panel, its life, wiper and contact contamination, and the reduced resistance to wear of the metals that can be used on printed circuit boards, as contrasted with the metal alloys normally used for bank contacts in stepping switches.

Accordingly, one object of this invention is to provide a new and improved stepping switch.

Another object is to provide a stepping switch including new and improved mounting means.

A further object is to provide a stepping switch using printed circuit boards for electrically connecting and mechanically mounting the switch for quick detachable connection.

A further object is to provide a new and improved bank level contact assembly for stepping switches.

Another object is to provide a stepping switch capable of being completely mounted and electrically connected using only conventional printed circuit board connectors.

In accordance with these and many other objects, an embodiment of the invention comprises a stepping switch of a known construction including a frame carrying a plurality of rotatably or movably mounted wipers corresponding to the number of switch levels provided which are indexed or advanced step-by-step to successive settings under the control of a motor magnet or electromagnetic operator. Each bank level includes a plurality of contacts molded in an insulating support and having both contact portions disposed at one side of the support adapted to be engaged by the wipers and connector portions disposed on the other side of the support and offset out of the plane of the contact portions. A printed circuit panel is inserted between adjacent pairs of the bank levels and is disposed in a plane generally parallel to and located between the planes in which the contact portions of the contacts in the two bank levels are disposed.

The printed circuit panel includes conductive segments or layers on both sides thereof connected at one end to the offset connecting portions of the contacts in the two adjacent banks and extending to and terminating at an edge portion of the printed circuit board or panel to provide an edge connector. The edge connectors of all of the panels are adapted to be received in conventional edge connector receptacles to provide the sole means for mechanically mounting the stepping switch on a supporting structure and for extending all of the necessary electrical circuits between the stepping switches and the external system and circuitry. Thus, the stepping switch can be removed or replaced merely by withdrawing a stepping switch from the connector receptacle and inserting a replacement switch, and without requiring any alteration in any circuit connections.

Many other objects and advantages of the present invention will become apparent from considering the following detailed description in conjunction with the drawings in which.

Figure 1:
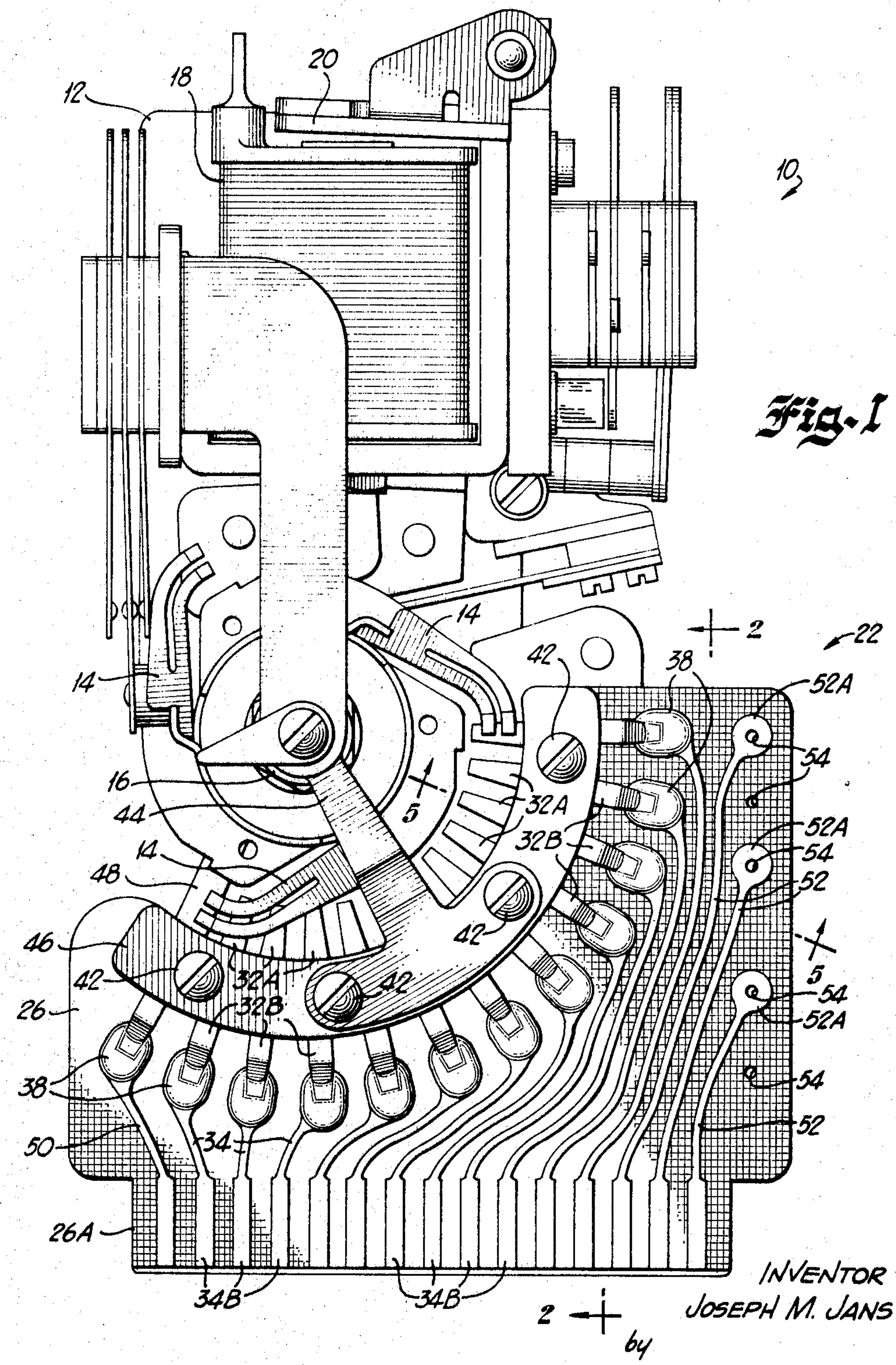
FIG. 1 is a side elevational view of a stepping switch construction embodying the present invention.

Referring now more specifically to FIG. 1 of the drawings, therein is illustrated a stepping switch which embodies the present invention and which is indicated generally as 10. The general construction of the stepping switch 10 is well known and includes a supporting frame 12 on which a plurality of spaced sets of wipers 14 are mounted for rotation about the axis of a shaft 16 in axially spaced position. The number of sets of wipers 14 is determined by the number of bank levels provided in the switch 10. The shaft 16 and thus the sets of wipers 14 are advanced step-by-step by a conventional intermittent drive or pawl drive mechanism actuated by a motor magnet or drive means 18 including a pivotally mounted armature 20 which is linked to the pawl drive mechanism. The switch 10 includes a bank level assembly indicated generally as 22 which includes the contacts successively engaged by the wipers 14 in their successive settings and which serves to provide the sole means for mechanically mounting the stepping switch 10 and extending all of the necessary connections thereto.

Figures 2, 3, 4, 5, 6:
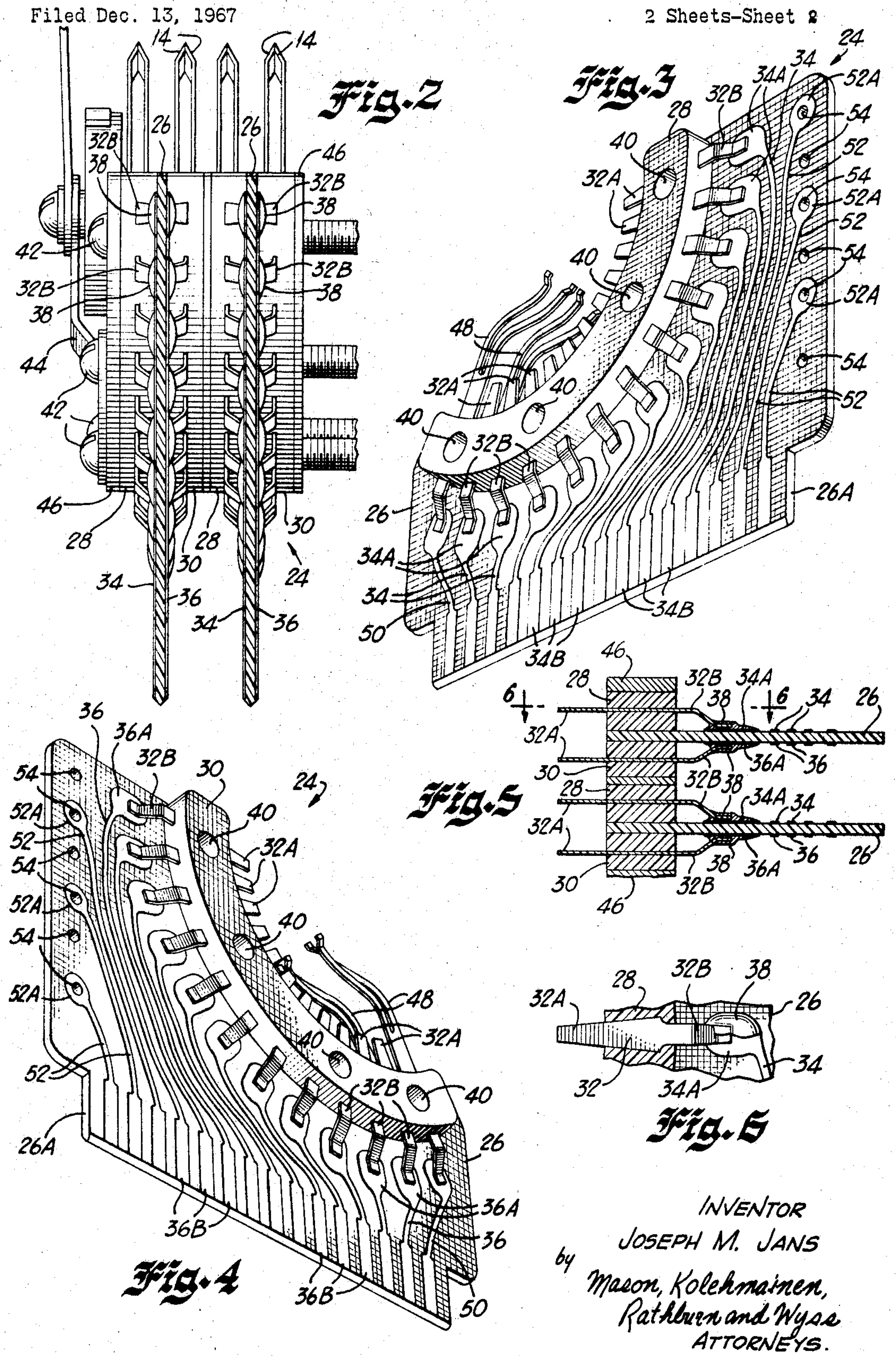
FIG. 2 is a fragmentary sectional view taken along line 2—2 in FIG. 1 illustrating the bank levels of the stepping switch.
FIG. 3 is a perspective view of one side of a double bank level assembly used in the switch shown in FIG. 1.
FIG. 4 is a perspective view of the other side of the double bank level assembly shown in FIG. 3.
FIG. 5 is a fragmentary sectional view of two dual bank level assemblies taken along line 5—5 in FIG. 1.
FIG. 6 is a fragmentary elevational view taken along line 6—6 in FIG. 5.

The bank level assembly 22 includes a plurality of bank level sub-assemblies indicated generally as 24 (FIGS. 2–4). Each of these sub-assemblies includes a generally uniplanar printed circuit panel or insulating panel 26 interposed between two generally arcuate insulating supports 28 and 30, in each of which are molded in a conventional manner a plurality of metal contacts 32. The contacts 32 are molded into or otherwise secured to the insulating supports 28 and 30 in a spaced and generally arcuate arrangement so that contact portions 32A of the contacts 32 are adapted to be engaged by or received between the bifurcated wipers 14 as they are advanced to their successive settings. The bodies of the contacts 32 in the insulating supports 28 and 30 lie generally within a single plane, and these contacts include connecting portions 32B offset from the plane of the contact portions 32A toward the plane of the printed circuit board or panel 26. As illustrated in FIG. 5, for instance, the connecting portions 32B of the contacts 32 in the insulating supports 28 are offset downwardly toward the plane of the insulating panel 26, and the contacts 32 in the insulating supports 30 are offset upwardly toward the plane of the insulating panel 26.

The printed circuit or insulating panel 26 includes a plurality of conductive segments or layers 34 on the side of the board 26 adjacent the support 28 and a plurality of similar electrically conductive segments or layers 36 on the side of the panel 26 adjacent the support 30. Each of the segments or layers 34, 36 includes an enlarged portion 34A, 36A at one end and an edge connector portion 34B, 36B disposed along an edge portion 26A of the insulating panel 26.

The printed circuit panel 26 is formed with a generally arcuate edge corresponding to the configuration of the insulating supports 28 and 30, and this edge is inserted between adjacent pairs of the supports 28 and 30 with the connector portions 32B of the contacts 32 disposed in immediate proximity to or bearing against the enlarged portions 34A and 36A of the conductive layers 34. These connector portions 32B are then connected, as by a mass of solder 38, to the enlarged portions 34A and 36A thereby joining the insulating members 26, 28, and 30 together and establishing electrical connections between the contacts 32 and the conductive layers 34 and 36 on the panel 26. The arcuately formed edge of the panel 26 is provided with apertures aligned with a plurality of apertures 40 formed in the insulating supports 28 and 30 to provide means for receiving, in an insulating relation to the contacts 32, a plurality of fastening bolts 42 which secure the contact level assembly 22 on the frame 12 of the stepping switch 10, as by the use of a connecting metal bracket 44 (FIG. 1) at one end of the assembly 22. Other suitable connecting means receiving the bolts 42 can be provided at the other end of the assembly 22. The bolts 42 in addition to mounting the assembly 22 on the frame 12 of the stepping switch 10 also maintain the insulative supports 28 and 30 with the interposed portions of the insulating panel 26 in an assembled relation and with the plane of the panel 26 extending generally parallel to and interposed between the planes of the contacts 32 carried in the members 28 and 30. Suitable insulating spacers 46 can be interposed between adjacent sub-assemblies 24 and at the other ends of the assembly 22.

Each of the sub-assemblies 24 includes a pair of additional electrically conductive and elongated resilient contacts or wipers 48 for extending connections to the wipers 14. Each of the contacts 48 is carried on one of the insulating supports 28 and 30 and includes a connector portion connected to an additional elongated and electrically conductive layer or segment 50 on tne panel 26. In addition, one or more of the sub-assemblies 24 can include one or a group of additonal electrically conductive layers or segments 52 (FIGS. 1, 3, and 4) which extend between the edge portion 26A on the panel 26 and apertures 54 formed in the board 26 to provide means for electrically connecting the winding of the motor magnet 18 or the interrupter and off-normal springs of the stepping switch 10 with external circuitry. The leads from these components of the switch can be inserted in the openings 54 and connected, as by soldering, with enlarged portions 52A of the layers 52 surrounding the openings 54. The layers 52 can be provided on one or both sides of the insulating panel 26.

When the stepping switch 10 is to be mounted on a circuit or a chassis in either a vertical or a horizontal position, the edge portions 26A of all of the insulating panels 26 are aligned with suitable edge connector receptacles, and the switch 10 is then manually moved toward the receptacles to insert the edge portions 26A into the receptacles. The receptacles include suitable connecting means bearing against the connector portions 34B, 36B of the conductive layers to complete the necessary electrical circuits between the stepping switch 10 and the external circuitry. In addition, the insertion of the edge portions 26A of the printed circuit panels 26 provides adequate and the sole physical support for the stepping switch 10. In one stepping switch 10 constructed in accordance with the present invention, the sub-assemblies 24 are mounted on .4 inch centers to be inserted into standard 15-pair edge connectors, and the insertion force required to install the switch 10 has been determined to be on the order of five pounds for each panel 26. In other words, if the switch 10 includes six levels or three bank level sub-assemblies 24, the total insertion force required is fifteen pounds.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. A stepping switch of the type having wiper means advanced to successive settings by drive means comprising a plurality of spaced contacts having first and second ends, the first end of the contacts being adapted to be engaged in succession by the wiper means in the successive settings of the wiper means, insulating means mounting the contacts in spaced positions and generally positioned intermediate the first and second ends of the contacts, an insulating panel secured to the insulating means and having an edge spaced from the insulating means, a plurality of spaced electrically conductive layers carried on the insulating panel, each of said layers extending from a position adjacent the second end of one of the contacts to a position adjacent said edge to provide an edge connector, and means connecting the second end of each of the contacts to the adjacent layer to electrically connect the contacts to the edge connector.

2. A stepping switch of the type having wiper means advanced to successive settings by a drive means comprising a plurality of metal contacts including contact portions and offset connecting portions, insulating means mounting the contacts in spaced positions with the contact portions disposed in a given plane to be engaged by the wiper means in its settings and with the connecting portion extending out of said given plane, a generally uniplanar panel disposed adjacent the insulating means and located in a plane spaced from but generally parallel to said given plane, the panel being spaced from the contact portions of the contacts and disposed adjacent the connecting portions, said panel having an edge portion spaced from the insulating means, a plurality of electrically conductive layers on the panel extending from said edge portion to positions adjacent the connecting portion of the contacts, and means rigidly securing each of the connecting portions to one of the layers so that the layers at the edge portions of the panel provide a detachable connection for extending electrical circuits to the contacts.

3. A stepping switch of the type having a plurality of spaced wiper means concurrently advanced to successive settings by drive means comprising a plurality of contact levels mounted in spaced positions adjacent the wiper means, each of said contact levels including an insulating support holding a plurality of contacts in spaced positions, the contacts in each level having a connecting portion and an end portion adapted to be engaged by one of the wiper means, a plurality of insulating panels, each panel having a plurality of conductive layers on each side extending to an edge portion adapted to be received in a connector, mounting means mounting each of the panels between adjacent pairs of contact levels, and means connecting the conductive layers on the panels to the connecting portions of the contacts, the conductive layers on one side of a given panel being connected to the connecting portions of the contacts in the level on one side of the panel and the conductive layers on the other side of said given panel being connected to the connecting portions of the contacts in the level positioned on the other side of the panel.

4. The stepping switch set forth in claim 3 in which the contacts of each contact level are molded in said insulating support with the end portion engaged by the wiper means located on one side of the insulating support and with the connecting portions of the contacts located at the opposite side of the insulating support.

5. The stepping switch set forth in claim 4 in which the connecting portions of the contacts in the pair of contact levels located on opposite sides of an insulating panel are offset toward each other.

6. The stepping switch set forth in claim 3 in which the mounting means includes common fastening means passing through aligned openings in the contact levels and the insulating panels.

7. The stepping switch set forth in claim 3 including a resilient and electrically conductive member carried on the insulating support for a given contact level and adapted to establish an electrically conductive circuit to the wiper means for said given contact level, and an additional conductive layer on the insulating panel adjacent said given contact level connected to said resilient member.

8. A stepping switch adapted for quick detachable connection to a mounting receptacle comprising a switch supporting frame, wiper means movably mounted on the frame, electrically operated drive means carried on the frame and coupled to the wiper means for advancing the wiper means to successive settings, a contact level assembly including a plurality of spaced metal contacts lying in one plane and adapted to be engaged by the wiper means and an insulating panel lying in a different plane spaced from and parallel to the plane of the metal contacts having a plurality of conductive layers, each of said metal contacts being connected to one of the conductive layers and additional ones of the layers being electrically connected to the drive means, each of said conductive layers extending to an edge of the insulating panel to provide an edge connector adapted to be removably received in the receptacle, and means rigidly securing the contact level assembly to the frame so that when the edge connector is inserted in the mounting receptacle the stepping switch is mechanically supported solely by the insulating panel and all of the electrical connections to the stepping switch are made through the conductive layers on the insulating panel.

References Cited

UNITED STATES PATENTS

| | | | |
|---|---|---|---|
| 1,520,821 | 12/1924 | Kaisling | 335—114 |
| 2,616,994 | 11/1952 | Luhn | 200—11 |
| 2,755,347 | 7/1956 | Allison | 200—11 |
| 2,906,838 | 9/1959 | Deighton | 200—11 |

G. HARRIS, Primary Examiner

H. BROOME, Assistant Examiner

U.S. Cl. X.R.

200—11